United States Patent
De Peuter et al.

(10) Patent No.: US 9,779,181 B2
(45) Date of Patent: Oct. 3, 2017

(54) DYNAMIC FOLDING OF LISTED ITEMS FOR DISPLAY

(75) Inventors: Geert De Peuter, Turnhout (BE); David Bonnell, Reading (GB)

(73) Assignee: BMC Software, Inc., Houston, TX (US)

( * ) Notice: Subject to any disclaimer, the term of this patent is extended or adjusted under 35 U.S.C. 154(b) by 1765 days.

(21) Appl. No.: 11/956,498

(22) Filed: Dec. 14, 2007

(65) Prior Publication Data

US 2009/0158192 A1 Jun. 18, 2009

(51) Int. Cl.
| | |
|---|---|
| G06F 17/21 | (2006.01) |
| G06F 3/048 | (2013.01) |
| G06F 17/00 | (2006.01) |
| G06F 17/30 | (2006.01) |
| G06F 3/0482 | (2013.01) |
| G06F 9/44 | (2006.01) |

(52) U.S. Cl.
CPC ...... G06F 17/30994 (2013.01); G06F 3/0482 (2013.01); G06F 9/4443 (2013.01)

(58) Field of Classification Search
CPC ............. G06F 3/0482; G06F 17/30126; Y10S 707/99934
USPC ......... 715/853, 840, 843, 854, 828; 707/754
See application file for complete search history.

(56) References Cited

U.S. PATENT DOCUMENTS

| | | | | |
|---|---|---|---|---|
| 6,341,280 | B1 * | 1/2002 | Glass et al. | 707/754 |
| 6,448,985 | B1 * | 9/2002 | McNally | 715/784 |
| 6,484,190 | B1 * | 11/2002 | Cordes et al. | 715/207 |
| 7,472,356 | B2 * | 12/2008 | Vronay et al. | 715/828 |
| 7,610,564 | B1 * | 10/2009 | Pfohe et al. | 715/854 |
| 2006/0036568 | A1 * | 2/2006 | Moore et al. | 707/1 |
| 2006/0129569 | A1 * | 6/2006 | Dieberger et al. | 707/100 |
| 2007/0203920 | A1 * | 8/2007 | Bertram et al. | 707/100 |

OTHER PUBLICATIONS

Microsoft® Office Online "Help and How-to: Show or hide multiple program buttons on the Windows Taskbar" downloaded from http://office.microsoft.com/en-us/help/HP052702371033.aspx?mode=print on Aug. 25, 2008.
Eclipse—an open development platform; "Basic Tutorial: OTI Employee" Eclipse 3.1 documentation downloaded from http://www.eclipse.org/documentation/.
Moolenaar; "Vim documentation: fold" for Vim version 7.0; VIM Reference Manual downloaded from http://vimdoc.sourceforge.net/htmldoc/fold.html.

* cited by examiner

*Primary Examiner* — Jordany Nunez
(74) *Attorney, Agent, or Firm* — Brake Hughes Bellermann LLP (57) ABSTRACT

A list folding process dynamically groups items of a list into logically related visual folds to reduce the number of items to be displayed in a window of a computer screen. The process determines attributes of the items to be displayed and dynamically groups items together into a special group called a visual fold based on the attributes. The rules for folding items based on attributes can be defined by a particular user so that each view of the items may be different among users. As the attributes of each item change, the display of the items and visual folds may be automatically adjusted to reflect the current proper grouping. The folding process therefore allows a user to view the maximum amount of information in available display area of a computer screen window.

22 Claims, 6 Drawing Sheets

DYNAMIC FOLDING OF LISTED ITEMS FOR DISPLAY

BACKGROUND

The invention relates generally to organizing lists of display items generated by computer systems and, more particularly but not by way of limitation, to a method and system for logically and automatically associating multiple display items with common attributes to a group fold whereby the group of items will only require a single display item in the list.

Displaying lists of items, either vertical or horizontal, on a computer screen poses problems because the viewable display area on the computer screen is often limited. If there are too many items to be listed than can actually fit in the available display area, the list is typically clipped on the screen, and scrollbars are displayed to allow a user to navigate to the clipped data. Several methods to alleviate these problems are known in the prior art. One technique involves simply sorting the dataset items to position the desired items together for display. While this aggregates the desired items together, there may still be too many desired items than can fit on the display, and the clipping problem remains.

Another prior art technique used to display a list of items involves partitioning a single list of items into smaller sub-lists based on a hierarchical organization. One example of this hierarchical approach is the tree view control that is popular in user interfaces of many modern applications. In the tree view control, a hierarchical listing of nodes is displayed on the computer screen. The nodes represent sub-lists of items and may be expanded or collapsed to respectively show or hide the items in the sub-list as necessary. Each sub-list may have both list items and further sub-lists.

Figure 1:
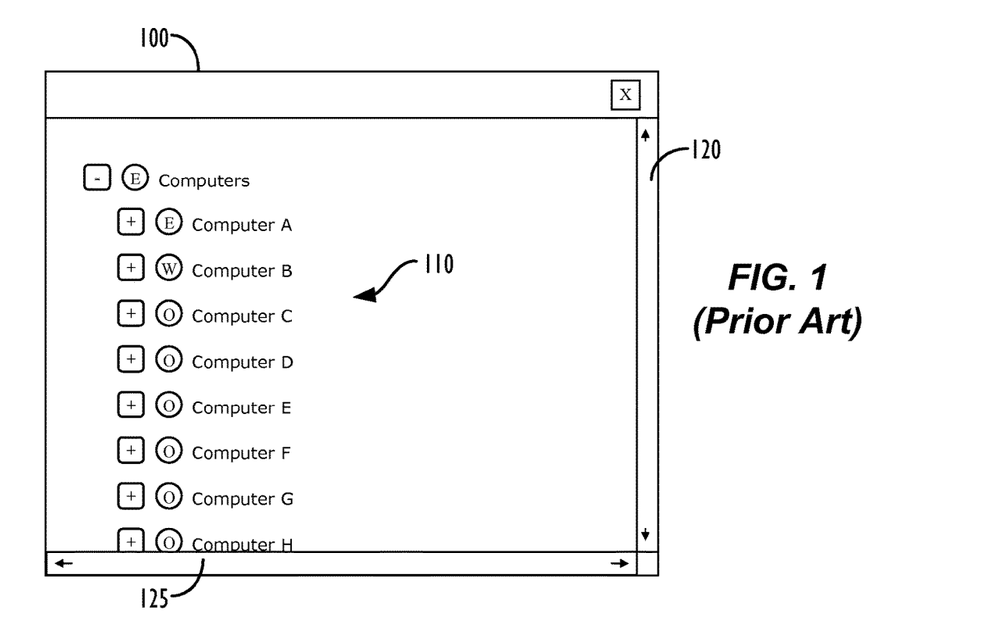
FIG. 1 illustrates a traditional tree view display according to the prior art.

For example, FIG. 1 shows a tree view 110 according to the prior art displayed in a window 100 for a computer screen. In general, the prior art tree view 110 can have one or more parent nodes and zero or more sub-nodes. The relationship of each tree view item (i.e. element or node) to its parent node is determined from present descriptive aspects of the items to be listed at the time the tree view is created. For example, items such as files in a directory of a file system may be visually listed in a tree view based on the item's name and present location in the directory. Because fixed hierarchical rules are traditionally imposed on the items to be listed, each item may have additional descriptive aspects that are not displayed (i.e., geographic location of item, update time of item, or security status of item). In other words, the tree view control presents items merely within the context of a parent and child relationship based on fixed hierarchical rules applied to a predefined descriptive aspect of the items to be listed.

Hierarchical listing such as in tree views presents several problems for users when navigating through information displayed on a computer screen. One issue with hierarchical listing revolves around how the items are actually partitioned, which as noted above is typically fixed by the application developer. In another issue, a tree view having a deep hierarchical listing with numerous sub-lists is difficult for the user to navigate through on the computer screen, and there is a practical limit as to how much of the entire list should be partitioned into sub-lists. Therefore, the user has no guarantee that the sub-lists at the extremities of the tree view will be small enough to overcome the need for scrollbars. In other words, as the number of elements in a tree view increases, the usability of the tree view control decreases. For example, a tree view with 100 or even 1,000 items under a single parent node may no longer be presentable in the available display area without the introduction of scrollbars to permit the user to navigate the list of items.

More recently, Office Outlook® (Outlook), an electronic messaging application provided by Microsoft Corporation (Microsoft), provides a feature in which mail messages in a user's Inbox can, by default, be organized according to the date they were received, with groups such as "Today", Monday", "Last Week", "3 Weeks Ago" and "Older". (OUTLOOK is a registered trademark of Microsoft Corporation.) These organizations may be expanded and collapsed to show and hide messages, respectively. Other standard arrangements include, for example, priority, sender, and topic. Custom organization by up to four user-selected criteria may also be used.

Outlook's organization of messages is aimed at organizing the messages rather than maximizing the number of items that can be displayed on the screen at one time. Moreover, Outlook creates an organization whether there are one or one hundred messages for the criteria, and every message is placed in such an organization. Because each organization heading occupies valuable screen display area, creating an organization heading for a single item is wasteful. Furthermore, forcing an all-or-nothing approach to organizing the messages is restrictive. For example, it is not possible to organize just messages from "Bob" while leaving all of the other messages unorganized.

SUMMARY

A list folding technique optimizes the amount of information that can be displayed in a window of a computer screen at one time by dynamically folding (i.e., grouping) list items for display. Dynamic folding produces one or more visual folds having at least two or more list items. The visual folds reduce the display area required to show the list items in a window of a computer screen while still providing the user with information for identifying the folds, groupings, and list items associated therewith.

Dynamic folding is done automatically and can be refined by user-supplied rules to optimize the amount of pertinent information displayed relative to the display area of the window. The folding process requires no persistent object or storage container and can be tailored for the particular user actually viewing the currently folded list items. Because no persistent data associations are required to maintain the visual folds, logical or visual relationships are dynamically determined between the list items, and the determined visual relationships are used to create the visual folds. To achieve dynamic folding, calculations for the folding process are performed at the time the list is displayed. In this way, data associations for folding need not be maintained in an application program or persistent data store.

DETAILED DESCRIPTION

Figure 2:
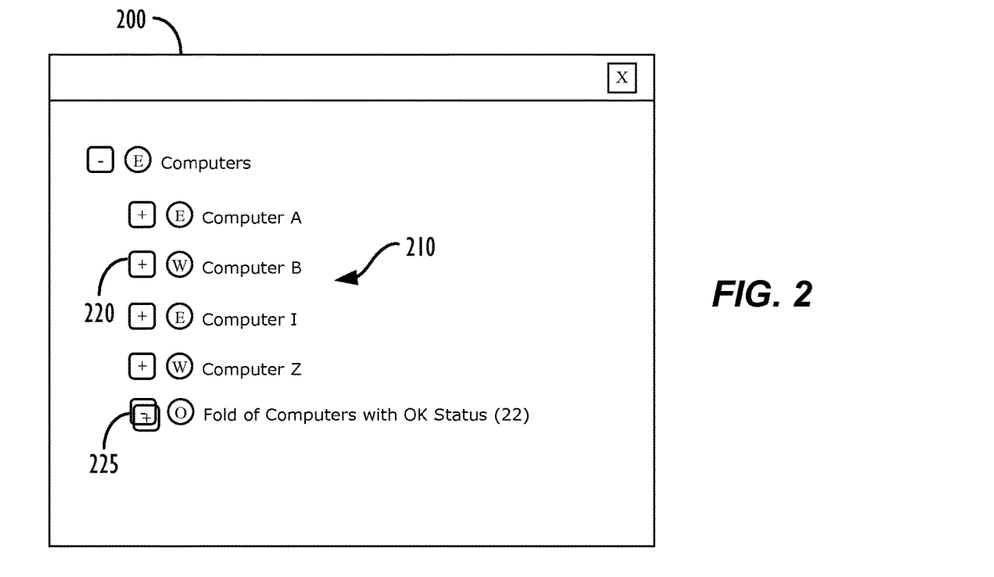
FIG. 2 illustrates a display window for a computer screen having a dynamically folded list created by a list folding process in accordance with one embodiment of the invention.

FIG. 2 illustrates a display window 200 for a computer screen having a dynamically folded list 210 created by a list folding technique in accordance with one embodiment of the invention. As shown, dynamically folded list 210 has listed elements 220 and 225 that are arranged for display in window 200. In this illustrative example, the dataset items to be listed in display window 200 on the computer screen contain information about a plurality of network system computers. As will be appreciated, such a network system may have hundreds or thousands of computers. A network administrator wishing to review information about the numerous computers may use an application that displays the information in display window 200.

As can be seen in FIG. 2, there are no scrollbars required to display the information window 200 because all twenty-two computers with OK status have been grouped together and displayed under a visual fold 225. Each folded item in this visual fold 225 has been dynamically grouped together based on their shared status (e.g., OK status). In this way, the network administrator viewing this screen can view pertinent information about the numerous network computers within window 200's viewable area without needing to adjust the display area using scrollbars.

As alluded to above and discussed in more detail later, elements 220 and 225 in FIG. 2 are listed based on folding rules or criteria dynamically applied to various attributes of the items to be listed for display. In contrast to the typical hierarchical listing of the prior art based on descriptive aspects of the items to be listed, the dynamic folding of elements 225 is based on attributes associated with the objects to be listed (e.g., information about network computers in this example).

Figures 3A, 3B, 4:
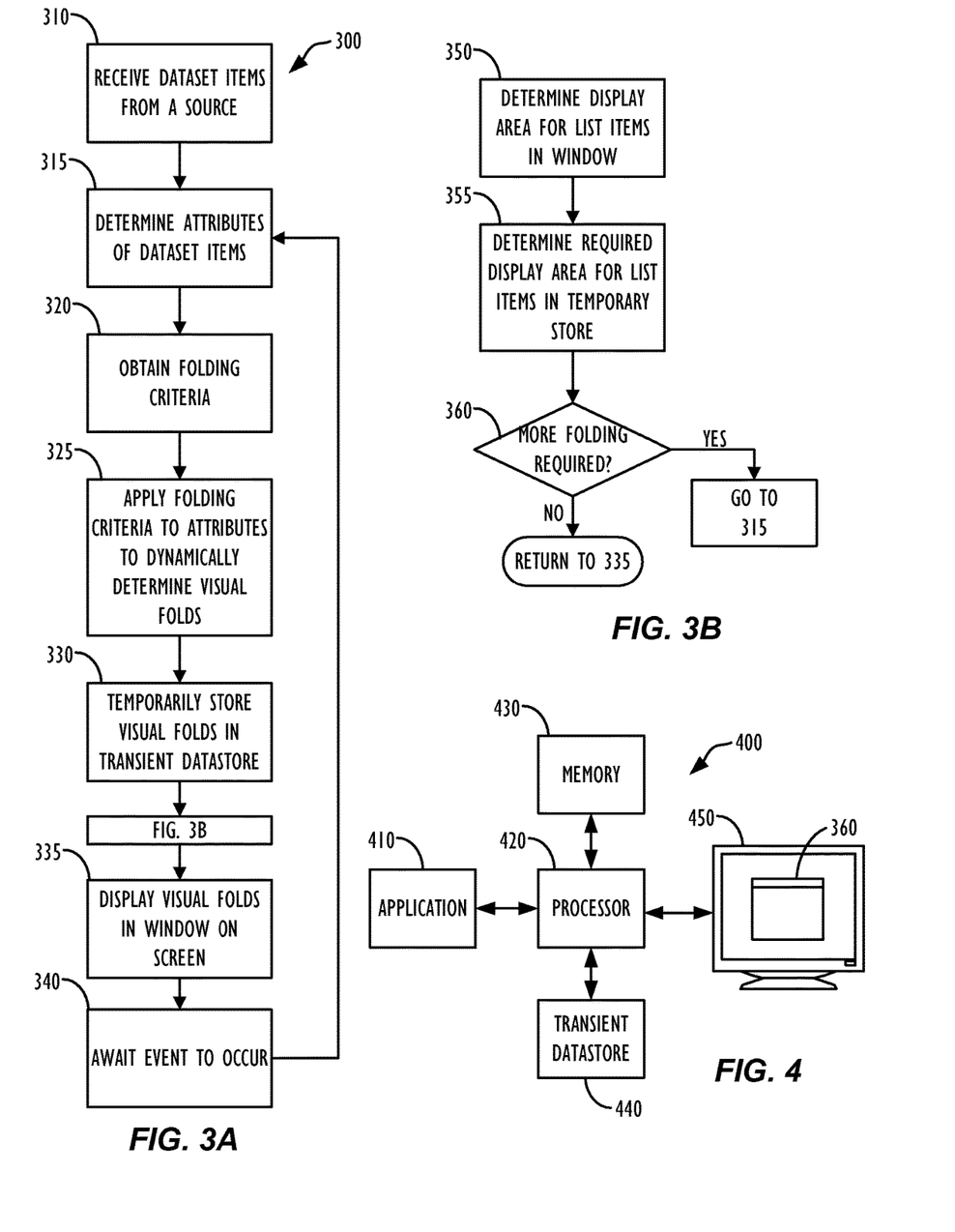
FIGS. 3A-3B are flowcharts of a process for dynamically folding dataset items for display in a window on a computer screen.
FIG. 4 illustrates a block diagram of an apparatus for using the disclosed dynamically folded list.

To create such a dynamic fold as in FIG. 2, a folding process dynamically applies folding criteria to the attributes associated with the dataset items to be listed and generates the folded result for display in a computer screen window. FIG. 3A shows a dynamic folding process 300 according to the present disclosure that can be used by an apparatus 400, such as a computer, schematically shown in FIG. 4.

Initially, process 300 operating on processor 420 of apparatus 400 receives dataset items from a source, such as an application executing on apparatus 400 (Block 310). The dataset items can be any type of information suitable for display to a user on a computer screen. As in the example of FIG. 2, network administration software used by a network administrator can monitor a plurality of computers in a network. In such an example, the dataset items can be information related to computers and other devices on a network.

Process 300 determines attributes associated with the dataset items (Block 315). These attributes can describe various forms of information about the dataset items. In general, the attributes can be inherited, calculated, or synthetic. An inherited attribute refers to a descriptive property (e.g., file size, file permissions, timestamp) of the item to be listed. A calculated attribute is derived from a processing algorithm that uses user-supplied information, inherited attributes, and other system information to determine an aspect of the item to be listed. For example, if the item to be listed refers to computers in a network computing system, examples of calculated attributes can include the status of a computer as off-line/on-line and the state of a computer as one of alarm, warning or OK. A synthetic attribute is calculated from attributes of other items to be listed. In FIG. 2, for example, fold element 225's synthetic attribute can be derived from the items that are dynamically determined to belong to that particular folded element 225.

After receiving the dataset items, process 300 then obtains folding criteria or rules to apply (Block 320) and dynamically determines one or more visual folds for displaying the dataset items in the window by applying one or more folding rules to the attributes associated with the dataset items (Block 325). Multiple fold types and rules for folding can be defined. Default folding rules may include: 1) a fold should never be empty; 2) a single item should never be folded; and 3) a fold should not contain all items in the list. These folding rules can ensure that visual folds will not unnecessarily increase the depth of displayed elements and will not unnecessarily require an additional step (i.e., mouse click) from users to expand or collapse visual folds merely having one item.

In addition to the dynamic folds, folding rules can be applied regardless of the criteria used to select the fold items to be included in the fold. In one example, static folds can also be defined that are not bound by the default folding rules and will always be displayed. Static folds may be useful to summarize portions of a tree view or the like.

In addition to these constraints, folds can be constrained by one or more other user-defined rules. Examples of user-defined rules include: a rule to fold only those items of a specific type (e.g., create a fold for "computer" items only); a rule to fold items by type (e.g., create folds of items that have the same type); a rule to fold items having a specific state only; a rule to fold items by their states; a rule to fold items only if the number of items in the resulting fold will be greater than some user defined number, and other possible rules. It will be appreciated that generic rules can be configured for common attributes (e.g. filenames) and that rules that are more specific can be configured for a given type of data to be displayed. User-defined rules for folding can also be based on any attributes of the dataset items or values computed from these attributes.

In applying the folding rules, process 300 creates the visual folds such that each of the dataset items in a given one of the visual folds has at least one of the attributes in common with the other dataset items in the given visual fold and such that no visual fold has only one dataset item or all dataset items. Process 300 then temporarily stores the one or more visual folds in a transient data store 440 associated with window 460 for display (Block 330).

After determining the folds, process 300 then displays the one or more visual folds from the transient store along with any unfolded dataset items in the display window (Block 335). Due to the use of the visual folds, the amount of graphical area required to list all of the dataset items is reduced.

Once the visual folds and unfolded dataset items have been displayed, process 300 may wait for a particular event to occur before performing additional processing (Block 340). In one example, process 300 can be set to reprocess the dataset items periodically. In another example, process 300 can wait for an end user action to occur before reprocessing the dataset items for visual folds. For example, the end user may expand an existing visual fold displayed in the window to view information about those dataset items within the fold. If this occurs, then process 300 can reprocess the dataset items associated with the expanded fold by repeating blocks 315-335 to determine dynamic sub-folds for display in the window if not already determined. These and other types of events can be used to trigger reprocessing of dataset items for visual folds. The event may be an indication that the dataset has changed in some way, such as dataset items being added, removed or updated. If the system keeps a list of all the attributes used by all of the fold criteria of all of the rule sets, it may optimally ignore change events indicating a change to a dataset item attribute that is not in this set and hence cannot have an effect on the existing folds.

In an alternative embodiment, before displaying the visual folds, process 300 can use steps in FIG. 3B to determine if the current arrangement of visual folds and unfolded dataset elements will actually fit satisfactorily within the display area of current window 460 in which the items are to be displayed. In these extended steps, the process determines the display area available in window 460 for displaying the folds and unfolded items (Block 350) and determines the required display area needed to actually display the current folds and items (Block 355). If more folding is required (i.e., there is not enough display area to fit the folded and unfolded items in the display area without the need for scrollbars), then the process returns to block 315 of FIG. 3A to determine additional attributes from which to produce additional visual folds, perhaps even folding existing visual folds together as sub-folds of a more encompassing parent fold. These additional steps of FIG. 3B can further reduce the amount of graphical area in the window required to display the dataset items for Block 335.

In general, two principles guide dynamic folding process 300. First, a dynamic visual fold of list items should not be created if it would contain only a single item. Second, a dynamic visual fold should not be created if all items in the list would be contained in that fold. These principles may be altered by a user, for example, who might wish to see a single visual fold containing all items.

The actual folding process 300 can be performed at the front-end by a user interface (UI) control (e.g., a tree view control) or in the back-end (e.g., application server). Folding at the front-end may be preferable for two reasons. First, folds create additional items so folding at the back-end may increase the amount of data that must be sent to a client, which may be important when the data is being sent to the client over a network. Secondly, evaluating the folding criteria can consume processing cycles. If the back-end serves many clients, then the combined folding load can unduly burden the server and might be best distributed to the individual clients.

Figure 5A:
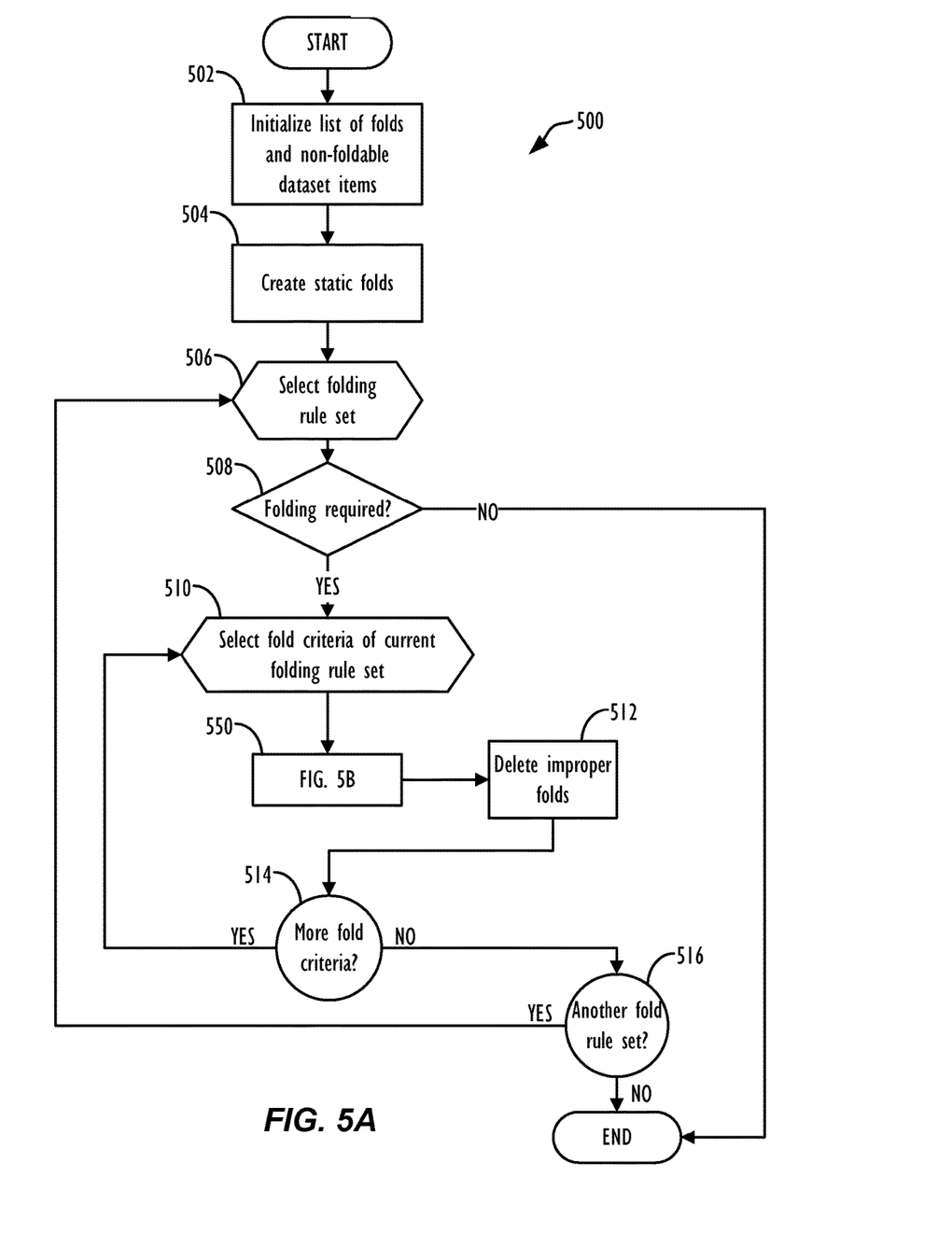
FIGS. 5A-5B are flowcharts of a dynamic folding process in which folding rule sets are also used.
Figure 5B:
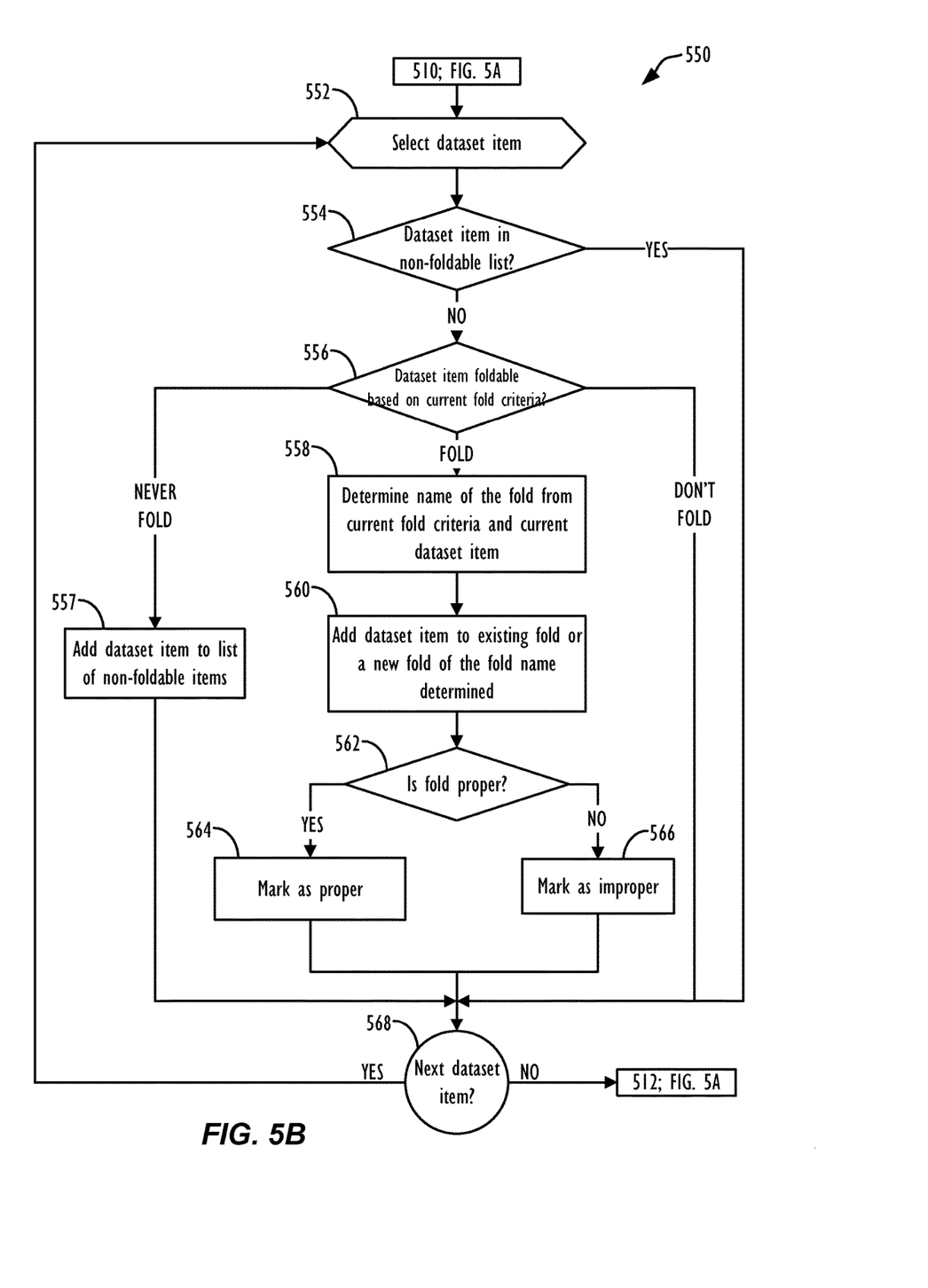

FIGS. 5A-5B illustrates a dynamic folding process 500 that uses folding rule sets. In this embodiment, the dynamic folding process is controlled by sets of folding rules grouped together in a priority set. Each prioritized rule set is applied in order. The higher rule sets (i.e., those processed later if required) typically represent a more aggressive grouping determination to ensure (if possible) that all dataset items will fit in the available display area without the need for scroll bars or the like.

Initially, process 500 initializes the list of folds and non-foldable dataset items (Block 502) and creates any static folds (Block 504). As used herein, a static fold is created from user-supplied attributes in which the user predefines particular list items that are intended to never be grouped into a visual fold for display. With static folds created, process 500 selects a first fold rule set for processing (Block 506) and determines if folding is required (Block 508). By selecting a fold rule set, process 500 can create folds in a consistent manner for the individual levels of a hierarchy of the dataset items. Also, to prevent the same item from being folded more than once based on a current folding criteria from the current fold rule set the fold criteria could return "DON'T FOLD" if the dataset item already belongs to a fold. In some uses it may be desirable to never allow a dataset item to be folded more than once. Adding a test to each fold criteria to explicitly check if the item is already folded may be a burden in this case and a user defined switch "Allow multiple folding" could be provided to allow or prevent a dataset item from being folded more than once.

In an alternative embodiment, process 500 can have different folding rule sets for different levels of a display hierarchy. In this way, process 500 can fold dataset items differently based on each dataset item's display level within the hierarchy. For example, a first folding rule set may specify that all visual folds in a first (parent) hierarchical level should contain at least ten dataset items to be a permissible fold, while a second folding rules set may specify that all visual folds in second (child) hierarchical level should contain twenty dataset items to be a permissible fold.

In the present embodiment, however, the folding rule sets pertain to prioritized rule sets. Regardless, folding may not be required at all, if the current unfolded dataset items and currently defined visual folds can be displayed satisfactorily in the display window's available area. If no more folding is required, then the folding process terminates, and the dataset item list may be optionally sorted for display to the end user. Sorting can be based on inherited, calculated or even synthetic attributes as described above.

If folding is required, however, process 500 selects folding rules or criteria for the current fold rule set to be applied to the dataset items (Block 510). The folding criteria to be applied can be defined by the user as a function of the dataset items' attributes, which can be inherited, calculated, or synthetic. In addition, the user can define the folding criteria as being either positive or negative, i.e., the user can indicate whether a given dataset item is to be or is not to be folded.

The folding criteria can potentially create any number of folds dynamically depending on the items to be folded. For example, a fold on the "priority" of incidents may fold all incidents into a fold with the same name as the priority, or it may choose to fold all incidents with a priority of "Medium" or "Low" into a single fold called "Other" and may not fold the "Critical" and "High" priority incidents, etc. When a fold criteria determines that a dataset item should be folded it therefore also determines the name of the fold, which can be a static value (e.g. "Other"), or a name composed dynamically from any combination of the dataset item's property values. The criteria also provide a label for the fold, which may be the same as the name or another value. For example, the criteria may include dynamically computed values such as the number of dataset items in the fold, the average value of some property of the dataset items, etc.

In the process, the folding criteria is retrieved in series from each rule set (or, alternatively, in parallel), each containing one or more rules, and sequentially applied to the currently arranged list of dataset items for display. However, application of the folding criteria can be short-circuited when no more folding is required because the processed list of dataset items will satisfactorily fit within the viewable area for display. In other words, folding criteria will continue to be applied to the dataset items only when more dataset items remain than can be satisfactorily displayed in the available display area. The rule sets group the fold criteria into batches that are applied atomically so that either all or none of the criteria in the rule set will be applied. Short-circuiting therefore occurs at the rule set level of granularity, although this may not be strictly necessary in some implementations. The folding criteria within a rule set may be used based on defined priority.

With the folding criteria selected, sub-process 550 discussed later in FIG. 5B then performs folding in the current fold rule set with the eligible dataset items based on the selected criteria, either adding the dataset item to a new or existing fold or not. At the end of sub-process 550, one or more folds of dataset items may have been created based on the current fold rule set, or no folds may have been produced. In addition, some dataset items may not be associated with a fold. The process then deletes any improper folds, which are those folds having only one dataset item or all dataset items. These items removed from an improper fold may be folded with other items during subsequent processing or may be individually displayed if not folded in subsequent processing. By contrast, a fold is proper if it is static, or if it has at least two items but does not contain all items in the dataset.

In looped operation, process 500 selects additional folding criteria, if available, repeating the acts of blocks 510-514. Likewise, process 500 in a looped operation selects additional folding rule sets, if available, repeating the acts of blocks 506 through 516, until all dataset items have been processed.

At the end of process 500, the dataset items have been dynamically folded, if they meet the criteria, into visual folds. Some dataset items may be folded into static folds, and other dataset items may not be in a fold so they will need to be listed independently. Each dynamic fold has at least two dataset items with fold criteria in common. These folds and unfolded dataset items can then be displayed in a window. Various visual folds for display can be created that contain particular dataset elements that have been dynamically grouped together based on the application of the folding criteria to their related attributes. Other dataset items may not be a part of a fold, either because they are predefined as being static or not indicated as being eligible to be folded. Also, other dataset items may not be part of a fold and may be individually listed for display because application of the folding criteria produced no commonality between the various attributes of these dataset elements.

As noted above, sub-process 550 in FIG. 5B applies criteria, determines the folds, and either adds dataset items to the folds or not. Beginning at block 552, a looped operation selects a dataset item (Block 552) and determines whether the dataset item is non-foldable based on the current fold criteria (Block 554). The fold criteria conditions are evaluated to determine if the dataset item should be folded, not folded, or never folded. This determination can be based on any actual or computed (synthetic) attribute of the dataset item or any other data available, such as the number of existing proper folds, etc.

Provided the selected dataset item is foldable, it is evaluated against the currently selected folding criteria to determine if the item is foldable (Block 556). If the result of block 556 is "NEVER FOLD", the item is added to a non-foldable items list. If the result of block 556 is "DON'T FOLD", this indicates the dataset item should not be folded at this time but should still be considered as a candidate for folding by other fold criteria. Otherwise, the item is foldable based on the current criteria, and the fold's name is determined using the current folding criteria and the dataset item (Block 558). With the fold name generated, the dataset item is added to an existing fold or a new fold having the determined name (Block 560).

Now, this fold is determined to be either proper or improper (Blocks 562-566). The fold is proper if it is a static fold or contains at least two items but does not contain all the items in the dataset otherwise the fold is improper. Such proper folds are intended to be displayed to the user and are held in a temporary data storage area for possible later grouping with another dataset item during processing. As long as there are more dataset items (Block 568), the looped operation repeats through blocks 552 through 568 until all of the dataset items for the fold rule set have been evaluated against the current fold criteria and either added to a new or existing fold or not.

The process of FIGS. 5A-5B can analyze the dataset items in a single pass through the items for eventual display in a window on a computer screen. Alternatively, the process of FIGS. 5A-5B can periodically reanalyze the dataset items for display. As each dataset item's attributes changes, for example, the process can automatically adjust the displayed list to reflect the current proper grouping of items automatically grouped together. In another alternative, the grouping of dataset items into visual folds can be controlled by the end user or by the end user's interaction with the displayed list in a window. For example, any given visual fold may have sub-folds within it that appear when the given fold is expanded. The creation of these sub-folds can be based on the display area within the window that is available after expansion of the original visual fold. As each visual fold or static fold is expanded or collapsed, the process of FIGS. 5A-5B can perform the dynamic grouping of dataset items, in a now expanded fold, at the time of display refresh.

As an example of how folding reduces the number of objects visible at a given level for display according to the processes of FIGS. 5A-5B, we return to a discussion of the listed elements in FIG. 2. In this example, visual fold 225 has been created because there are multiple items (e.g., computers) with the same value, "OK", for their status attribute. To allow the user to visually distinguish between unfolded nodes (e.g., 210) and automatically folded nodes (e.g., 215) in list view 210, a special indicator 225 is used for the folded items. In alternate embodiments, other visual cues (i.e., background, size, different types of text emphasis like bold or italic, etc.) can be used for the folded item separately or in conjunction with each other.

Now that an automatic folding process and resulting folded list produced thereby have been discussed above, we now turn to a number of examples of how folded lists can be created and displayed according to the techniques of the present disclosure.

Figure 6A:
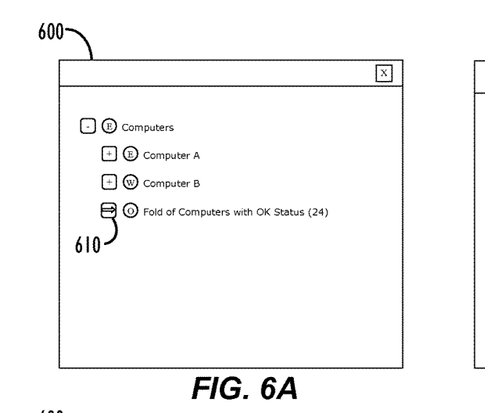
FIGS. 6A-6C illustrate expanded folding options in a dynamically folded list.

Referring to FIG. 6A, an example of a folded list of items is illustrated in a window 600 for display on a computer screen. In this list, some possible visual cues are shown for a set of twenty-six monitored computers. Of the monitored computers, twenty-four have status of OK, and these computers have been automatically grouped into a visual fold 610.

Visual fold 610 created with the technique of this disclosure assumes the common attributes and values of the folded items. For example, where the items were folded based on a "status" attribute, each item associated with fold 610 may have a synthetic "status" attribute with a value of "OK." A fold may also have certain automatic properties and user-defined properties. For example, a "numItems" property may automatically be created and set to the number of items in the fold, or the user may define a "label" property that has the text that should be used when displaying the visual fold. These properties may be used directly or indirectly to control certain visual aspects of how fold 610 and/or folded items are displayed.

Figure 6B:
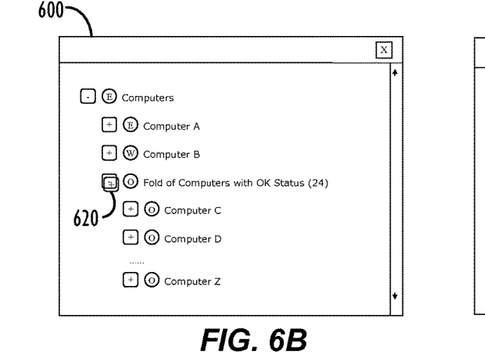
Figure 6C:
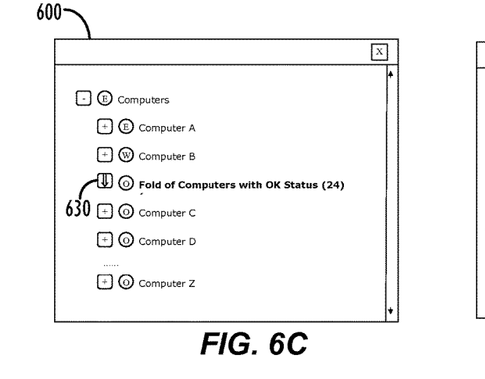

When the user expands fold 610, the items contained in fold 610 can be shown as if each fold item is an actual sub-node in a tree as shown in FIG. 6B. Alternatively, the folded items can be expanded at their original level in the tree as shown in FIG. 6C. This approach has the advantage of not introducing another level of indentation, which might require additional horizontal display space.

Various visual cues can be used to indicate the presence of a visual fold in display window 600. For example, the visual cue for a collapsed fold can be a right pointing arrow icon 610 as in FIG. 6A, and the visual cue may change to a double expand icon 620 as in FIG. 6B or a down pointing arrow icon 630 as in FIG. 6C indicating that the fold is expanded. Moreover, in addition to the use of an icon 630 for expansion, an expanded fold's label as in FIG. 6C can also be bolded to further emphasize the top of the list of previously folded items. Other possible visual cues include, for example, font, size, color, emphasis, background color, etc. The folded items' appearances themselves may similarly be changed. In display window 700 of FIG. 7, frame 710 shows a different background fill color applied to an expanded fold's entire area.

Figure 7:
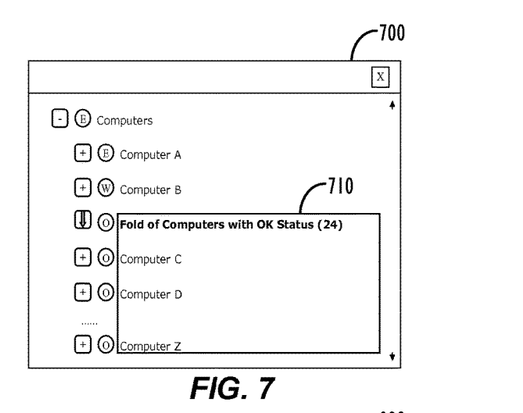
FIG. 7 illustrates a visual indicator applied to an expanded fold in the dynamically folded list.

The fold's visual attributes (e.g. background color) can be tied by the user to the folded items' attributes. For example, instead of some fixed background color (e.g., pale blue), the user can defined a custom color attribute for the folds that dynamically computes a background color using the value of the "status" or some other attribute of the folded items in the fold. Therefore, alert status can be assigned a red background color, while OK state can be assigned a green background color.

Figure 8A:
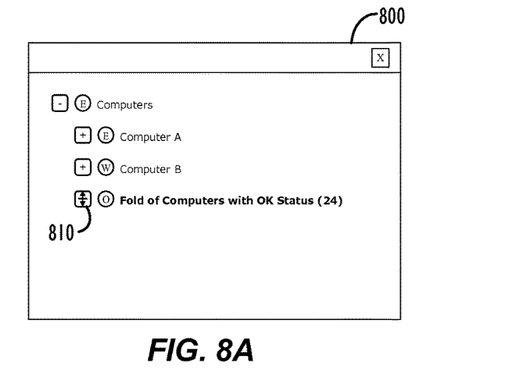
FIGS. 8A-8B illustrate a suppression of the fold start (and end) lines in an expanded fold in the dynamically folded list.
Figure 8B:
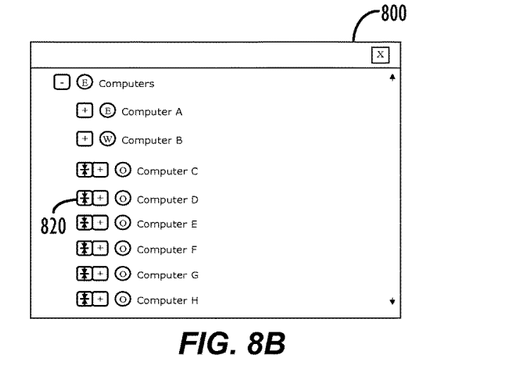

Another way to display folds may involve suppressing the fold start (and end) lines when the fold has been expanded, as illustrated in FIGS. 8A and 8B. Visual cues 820 replace fold cue 810 when the fold is expanded, and visual cues 820 reappear for each folded item in the list. These visual cues 820 indicate that the each item is a member of the same fold and can allow the user to collapse the entire fold directly from any of the folded items. Note that the visual fold item itself is no longer displayed.

Figure 9:
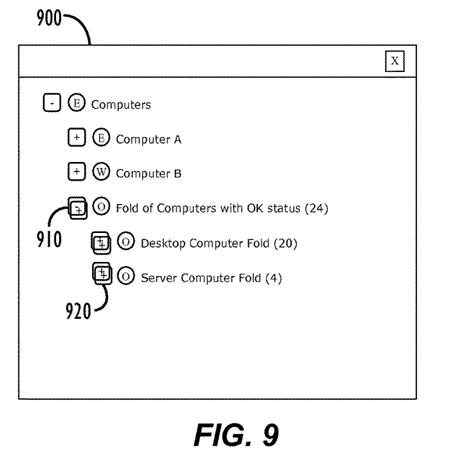
FIG. 9 illustrates a hierarchy of folds in the dynamically folded list.

FIG. 9 shows how the content of a fold can also be an item list so that expansion of the fold may display a hierarchy of sub-folds. For example, two levels of visual folds 910 and 920 are shown in display window 900 of FIG. 9. first visual fold 910 is shown expanded, revealing sub-folds 920 that contain folded items and fold names. Each visual fold 910 and 920 has a visual cue (double box) to indicate that it is a visual fold. A number of items attribute is also displayed in the fold's label to indicate the count of items grouped into each visual fold.

Figure 10:
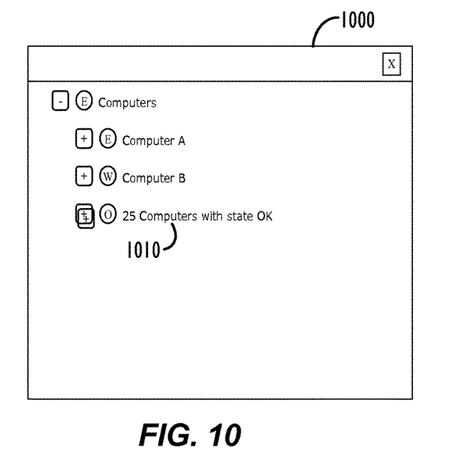
FIG. 10 illustrates attribute fold labeling in the dynamically folded list.

Each fold may have either a static or dynamic label (e.g., the text displayed in association with the visual fold). In FIG. 10, for example, a dynamic label 1010 is shown for a fold for computers with a status of OK. This dynamic label 1010 can be constructed using attributes for each computer in the fold. Dynamic label expressions could leverage arbitrary attributes of the fold, literal values, and any operators supported by an expression language. For example, if the expression language supports operators such as "min", "max", and "average," then a label displaying statistical information about the folded items in a fold can be used to create information for a dynamic fold label. Similarly, a "count" operator can allow the label to display dynamic counts of items with a particular attribute value (e.g., "Computers (21 OK, 2 WARN, 1 ALARM)". Because folds can use dynamic labeling, empty static folds can be created with dynamic label information. For example, an empty static fold may be displayed that is labeled "0 Computers with state OK". In this specific example the user's attention will be drawn to the fact that there are no computers with an OK status.

Figure 11A:
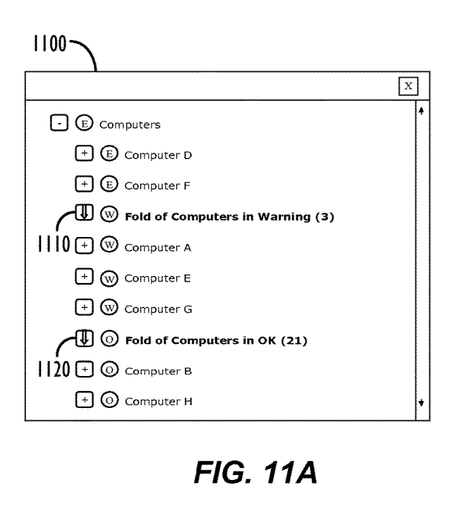
FIGS. 11A-11B illustrate sorting and synthetic attributes applied to the fold label in the dynamically folded list.

FIG. 11A shows how sorting items in a displayed list having folds can be performed in a window 1100. Two folds 1110, 1120 representing logical groups of items are shown listed with other items. To sort the folds within the list, sort criteria can be recursively applied to each fold to order the fold's items. In the simplest case, where the fold attributes are a subset of the sort attributes, nothing further is required. In the example shown in FIG. 11A, the fold criteria for folds 1110, 1120 has been based on status of computers, and sorting the folds has been performed first on the status and then on label.

Figure 11B:
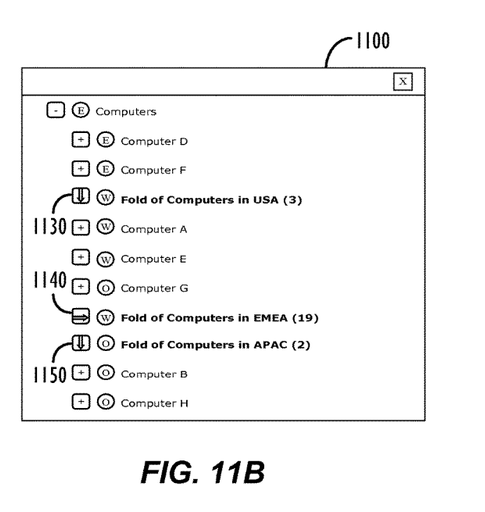

Alternatively, if the fold attributes are not a subset of the sort attributes, then fold items will always appear at the top (or bottom) of the top-level list, which may not be desirable. Consider a list of computers that is folded by "region," but sorted by "status" and "label". The intended result is illustrated in FIG. 11B. As items 1130, 1140, and 1150 are being folded by "region", the only fold attribute that can be automatically created are "label" and "region". Each fold's "label" is either the fold name or the result of evaluating a dynamic label expression defined by the user. Since a region fold does not have a "status" attribute, the sort on "status" will place all of the region folds either at the top or bottom of the list (depending on the implementation of the sort algorithm). To ensure the correct sorting behavior, a "status" attribute value can be created for the region folds. One way to do this would be to define a custom "status" attribute on the region fold using a suitable expression that returns the maximum (or worst) status of the items in each fold. For example, in addition to allowing correct sorting, synthetic attributes might also be used to drive other visual aspects of the fold such as its icon. The expression to generate the synthetic "status" attribute on the fold may be part of the fold criteria.

In the interest of clarity, not all features of an actual implementation are described in this specification. It will of course be appreciated that in the development of any such actual implementation (as in any software development project), numerous programming decisions must be made to achieve the developers' specific goals (e.g., compliance with system-related and business-related constraints), and that these goals will vary from one implementation to another. It will be appreciated that such development effort might be complex and time-consuming, but would nevertheless be a routine undertaking of computer system program development for those of ordinary skill having the benefit of this disclosure.

Various changes in the graphical, as well as in the details of the illustrated operational methods are possible without departing from the scope of the following claims. For instance, the illustrative folding methods may perform the identified folding steps in an order different from that disclosed here. Alternatively, some embodiments may combine the activities described herein as being separate steps. Similarly, one or more of the described steps may be omitted, depending upon the specific operational environment the method is being implemented in. In addition, acts in accordance with the methods of this disclosure may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM", Electrically Erasable Programmable Read-Only Memory ("EEPROM"), Programmable Gate Arrays and flash devices.

The foregoing description is presented to enable any person of ordinary skill in the art to make and use the invention as claimed and is provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

The invention claimed is:

1. A list folding method, comprising:
   receiving individual items for display;
   determining a first attribute for each item of the items for display, the first attribute for an item of the items for display including at least one descriptive property with an associated value derived from a respective value of a second attribute for the item for display;
   applying a first folding rule to the values of the first attribute, the first folding rule generating one or more visual folds, each visual fold including individual items having a value of the first attribute in common, wherein the first folding rule does not fold at least some items into the one or more visual folds based on the value of the first attribute; and
   displaying the at least some items not folded into the one or more visual folds with the one or more visual folds in a display area, so that the visual folds are displayed instead of any individual one of the items included in the one or more visual folds.

2. The method of claim 1, wherein the first folding rule has a highest priority among one or more prioritized sets of folding rules.

3. The method of claim 1, wherein displaying the one or more visual folds comprises identifying each one of the one or more visual folds in the display area with a respective visual cue.

4. The method of claim 1, wherein the second attribute is an inherited attribute.

5. The method of claim 1, further comprising:
   determining improper visual folds; and
   removing the improper visual folds, so that items included in the improper visual folds are not folded into the one or more visual folds,
   wherein improper visual folds include an empty visual fold and a visual fold with a single item, and a visual fold that includes all of the items.

6. The method of claim 1, wherein deriving the value of the first attribute includes using one or more user-defined folding rules to derive the value of the first attribute from the value of the second attribute.

7. The method of claim 1, further comprising:
   determining, prior to displaying the items, whether additional folding is needed; and
   when additional folding is needed, repeating the acts of determining attributes and applying a folding rule until the one or more visual folds and any remaining items fit within the display area.

8. The method of claim 1, wherein the one or more visual folds are temporarily stored in a transient data store associated with the display area.

9. The method of claim 1, further comprising receiving user input to expand one of the one or more visual folds, wherein the method further comprises repeating at least the acts of determining an attribute, applying a folding rule to generate one or more second visual folds and displaying the one or more second visual folds.

10. The method of claim 9 wherein repeating at least the acts of determining an attribute, applying a folding rule to generate one or more second visual folds, and displaying the one or more second visual folds is performed for only those items associated with the expanded visual fold.

11. The method of claim 9 wherein repeating the acts of determining an attribute, applying a folding rule to generate one or more second visual folds, and displaying the one or more second visual folds is repeated for all of the items for display.

12. The method of claim 9, further comprising displaying a visual cue associated with the expanded visual fold.

13. The method of claim 1, wherein displaying the one or more visual folds in the display area comprises:
   determining one or more display properties for each of the one or more visual folds based on attributes of the items included in a respective visual fold; and
   displaying each of the one or more visual folds with the one or more determined display properties.

14. The method of claim 13, wherein the display property comprises a font, an emphasis, a color, a background color, a name, a label, an icon, or a dynamically computed value for the visual fold.

15. The method of claim 1, wherein displaying the at least some items not folded into the one or more visual folds with the one or more visual folds comprises:
   sorting the at least some items not folded into the one or more visual folds and the one or more visual folds based on the value of the first attribute; and
   displaying the at least some items not folded into the one or more visual folds with the one or more visual folds after sorting.

16. A list folding method, comprising:
obtaining a plurality of items in a hierarchical list having a plurality of levels;
identifying first items in the plurality of items that are included in a static fold;
determining a first attribute for each item of the plurality of items, the first attribute having an associated value for at least some of the plurality of items;
dynamically grouping second items that are not first items, each grouping having second items with a common value for the first attribute;
folding the dynamically grouped items into one or more visual folds without creating a persistent container object for the visual folds; and
displaying the first items and the one or more visual folds in a display area instead of any individual one of the items included in the one or more visual folds.

17. The method of claim 16, further comprising repeating at least the acts of dynamically grouping and folding until the items included in the static fold, the one or more visual folds, and any items not included in the static fold or the one or more visual folds fit in the display area.

18. The method of claim 16, further comprising receiving user input to expand one of the one or more visual folds, wherein the method further comprises repeating at least the acts of dynamically grouping and folding for one or more second visual folds.

19. The method of claim 18 wherein the acts of dynamically grouping and folding are repeated for only those items associated with an expanded first visual fold.

20. The method of claim 18 wherein the acts of dynamically grouping and folding are repeated for all of the obtained items.

21. The method of claim 1, wherein the first attribute includes one or more calculated attributes or the first attribute includes one or more synthetic attributes, wherein the one or more calculated attributes include deriving from an algorithm using user-supplied information or using one or more inherited attributes, and the one or more synthetic attributes include deriving, from one or more other attributes of other items to be listed.

22. The method of claim 1, wherein the first attribute value is evaluated at display time.

* * * * *